United States Patent
Milia et al.

(10) Patent No.: US 10,858,520 B2
(45) Date of Patent: Dec. 8, 2020

(54) SMUDGE-RESISTANT GLASS ARTICLES AND METHODS FOR MAKING AND USING SAME

(71) Applicant: Corning Incorporated, Corning, NY (US)

(72) Inventors: Charlotte Diane Milia, Corning, NY (US); Wageesha Senaratne, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/296,599

(22) Filed: Mar. 8, 2019

(65) Prior Publication Data

US 2019/0203055 A1    Jul. 4, 2019

Related U.S. Application Data

(62) Division of application No. 13/683,133, filed on Nov. 21, 2012, now Pat. No. 10,233,333.

(60) Provisional application No. 61/563,200, filed on Nov. 23, 2011.

(51) Int. Cl.
| | | |
|---|---|---|
| C09D 5/00 | (2006.01) | |
| C03C 17/00 | (2006.01) | |
| C03C 17/30 | (2006.01) | |
| C03C 17/42 | (2006.01) | |

(Continued)

(52) U.S. Cl.
CPC .......... *C09D 5/00* (2013.01); *B05D 5/00* (2013.01); *C03C 17/002* (2013.01); *C03C 17/30* (2013.01); *C03C 17/42* (2013.01); *B82Y 30/00* (2013.01); *C03C 2217/75* (2013.01); *Y10T 428/24975* (2015.01); *Y10T 428/265* (2015.01)

(58) Field of Classification Search
CPC ...................................................... C09D 5/00
See application file for complete search history.

(56) References Cited

U.S. PATENT DOCUMENTS

| | | | | |
|---|---|---|---|---|
| 6,277,485 B1 * | 8/2001 | Invie | ............ | C09D 183/12 428/336 |
| 2007/0065570 A1 | 3/2007 | Kugler et al. | | |
| 2009/0197048 A1 | 8/2009 | Amin et al. | | |

(Continued)

FOREIGN PATENT DOCUMENTS

| | | |
|---|---|---|
| JP | 2001353808 A | 12/2001 |
| JP | 2010128363 A | 6/2010 |

(Continued)

OTHER PUBLICATIONS

Arkles; "Hydrophobicity, Hydrophilicity and Silanes"; Paint and Coatings Industry Magazine, Oct. 2006; 10 Pages.

(Continued)

*Primary Examiner* — Samir Shah
*Assistant Examiner* — Tong Guo
(74) *Attorney, Agent, or Firm* — Kevin M. Johnson

(57) ABSTRACT

Described herein are coated glass or glass-ceramic articles having improved smudge resistance. Further described are methods of making and using the improved articles. The coated articles generally include a glass or glass-ceramic substrate and an oleophilic coating disposed thereon. The oleophilic coating is not a free-standing adhesive film, but a coating that is formed on or over the glass or glass-ceramic substrate.

23 Claims, 7 Drawing Sheets

(51) Int. Cl.
  *B05D 5/00*    (2006.01)
  *B82Y 30/00*    (2011.01)

(56)     References Cited

U.S. PATENT DOCUMENTS

| | | |
|---|---|---|
| 2009/0239043 A1* | 9/2009 | Kondos ................ C09D 133/10 |
| | | 428/195.1 |
| 2011/0117147 A1 | 5/2011 | Ishida et al. |
| 2011/0217541 A1 | 9/2011 | Shimano et al. |
| 2012/0281292 A1 | 11/2012 | Baca et al. |
| 2013/0323466 A1 | 12/2013 | Baca et al. |

FOREIGN PATENT DOCUMENTS

| | | |
|---|---|---|
| JP | 04541306 B2 | 9/2010 |
| JP | 2011068000 A | 4/2011 |
| JP | 2011099744 A | 5/2011 |
| KR | 1053815 B1 | 8/2011 |

OTHER PUBLICATIONS

International Search Report of the International Searching Authority; PCT/US2012/066215; dated Jul. 17, 2013; 5 Pages; European Patent Office.
SRI International; "Anti-Smudge, Easy to Clean Product Coatings"; 2010; 2 Pages.
Taiwan Patent Application No. 101143965 Search Report dated Mar. 14, 2016, Taiwan Patent Office; 1 Page.

\* cited by examiner

SMUDGE-RESISTANT GLASS ARTICLES AND METHODS FOR MAKING AND USING SAME

CROSS-REFERENCE TO RELATED APPLICATIONS

This application is a divisional of U.S. patent application Ser. No. 13/683,133 filed on Nov. 21, 2012 which claims the benefit of priority under 35 U.S.C. § 119 of U.S. Provisional Application Ser. No. 61/563,200 filed on Nov. 23, 2011 the contents of which are relied upon and incorporated herein by reference in their entirety as if fully set forth below.

TECHNICAL FIELD

The present disclosure relates generally to smudge-resistant or anti-smudge coatings. More particularly, the various embodiments described herein relate to glass or glass-ceramic articles having oleophilic coatings disposed thereon such that the coated articles exhibit improved smudge-resistance, as well as to methods of making and using the coated articles.

BACKGROUND

Touch-activated or -interactive devices, such as screen surfaces (e.g., surfaces of electronic devices having user-interactive capabilities that are activated by touching specific portions of the surfaces), have become increasingly more prevalent. In general, these surfaces should exhibit high optical transmission, low haze, and high durability, among other features. As the extent to which the touch screen-based interactions between a user and a device increases, so too does the likelihood of fingerprint residue adversely affecting the touch screen surface.

Fingerprint residue, which can include not only natural fingerprint- or fingerborne-oils or grease, but also dirt, cosmetics, hand creams/lotions, or the like coupled therewith, can render a touch screen (or any other aesthetic or functional) surface unsightly and/or less user-friendly or functional. Further, an accumulation of such residue can lead to a distortion in the transmission and haze properties of the touch screen surface. That is, as a user contacts and operates the touch screen surface, fingerprint residue is transferred to the surface. When a fingerprint residue-rich region of the surface is subsequently manipulated, the fingerprint residue can smudge or smear across the surface. These smudges and smear marks are visible to the naked eye, and can affect how an image from the touch screen surface is observed by a user. With significant build-up, in some cases, these smudges and smear marks can interfere with the function of a device by obscuring objects that must be seen for use and/or transmission of information into or from the device.

To combat the deleterious effects of fingerprint residue transfer (or other undesirable residue transfer), numerous so-called "anti-fingerprint" or "fingerprint-resistant" technologies have been developed. These technologies generally involve making a modification to the touch screen surface and/or applying a coating or film to the touch screen surface to render the surface both hydrophobic and oleophobic. The aim of such approaches is towards preventing the transfer of fingerprint residue in the first place, while also enabling easy removal of any residue that ultimately is transferred. Unfortunately, while these technologies may improve the fingerprint "soiling" resistance of some touch screen or other surfaces, the improvements generally are at the expense of other features. For example, certain hydrophobic and oleophobic coating materials can cause a decrease in transmission, an increase in haze, and/or a decrease in scratch resistance relative to the uncoated touch screen surface.

Rather than focus on preventing fingerprint residue transfer as with anti-fingerprint technologies, a few alternative technologies have sought "anti-smudge" or "smudge-resistant" features, wherein the aim is towards enabling, or even promoting, fingerprint residue transfer. The transferred fingerprint residue can become hidden to the naked eye because it wets or coats the surface, instead of smudging or smearing, but can also be removed in a relatively easy fashion (e.g., by wiping with a cloth). Just as with anti-fingerprint technologies, however, existing smudge-resistant technologies are often accompanied by sacrifices in other desirable features (e.g., transmission, haze, strength, scratch resistance, and the like).

There accordingly remains a need for technologies that provide touch screen and other aesthetic or functional surfaces with improved resistance against the adverse effects of fingerprint or other undesirable residue. It would be particularly advantageous if such technologies did not adversely affect other desirable properties of the surfaces (e.g., transmission, haze, strength, scratch resistance, and the like). It is to the provision of such technologies that the present disclosure is directed.

BRIEF SUMMARY

Described herein are various articles that have improved smudge resistance, along with methods for their manufacture and use.

One type of coated article can include a glass or glass-ceramic substrate, and an oleophilic coating having an average thickness of less than or equal to about 100 nanometers disposed on at least a portion of a surface of the glass or glass-ceramic substrate. The coated article can have a first optical transmittance and a first haze after a first touch-and-wipe cycle (where each touch-and-wipe cycle includes tactilely contacting a portion of the coated article with a tactilely-transferred residue or other undesirable residue and subsequently tactilely wiping at least the portion) and a second optical transmittance and a second haze after undergoing a number of touch-and-wipe cycles, such that the first optical transmittance and the second optical transmittance can be substantially similar and/or the first haze and the second haze can be substantially similar when the number of touch-and-wipe cycles is at least 20. For example, in some situations, the second optical transmittance can be within 3 percent of the first optical transmittance when the number of touch-and-wipe cycles is at least 20 and/or the second haze can be within 5 percent of the first haze when the number of touch-and-wipe cycles is at least 20.

Similarly, a mass of tactilely-transferred residue remaining on the coated article after at least 20 touch-and-wipe cycles can be substantially similar to a mass of tactilely-transferred residue remaining on the coated article after the first touch-and-wipe cycle. For example, it is possible for the mass of tactilely-transferred residue remaining on the coated article after at least 20 touch-and-wipe cycles to be within 0.4 milligrams of the mass of tactilely-transferred residue remaining on the coated article after the first touch-and-wipe cycle.

In some implementations of this type of coated article, there can be an intermediate layer that is interposed between the glass or glass-ceramic substrate and the oleophilic coating. The intermediate layer can include a reflection-resistant coating, a glare-resistant coating, a color-providing composition, or the like.

With respect to the substrate of this type of coated article, in some cases, it can be formed from a silicate glass, borosilicate glass, aluminosilicate glass, boroaluminosilicate glass, or similar glass. In other cases, the substrate can be formed from a glass-ceramic comprising a glassy phase and a ceramic phase, where the ceramic phase includes β-spodumene, β-quartz, nepheline, kalsilite, carnegieite, or a similar ceramic material. In some applications, the glass or glass-ceramic substrate can have an average thickness of less than or equal to about 2 millimeters.

With respect to the oleophilic coating of this type of coated article, in some cases, it can be formed from an uncured or partially-cured siloxane comprising an organic side chain. For example, such materials include partially-cured linear alkyl siloxanes, one example of which is a partially-cured linear alkyl siloxane is a partially-cured methyl siloxane.

Applications for, or uses of, this type of coated article include forming a portion of a touch-sensitive display screen or cover plate for an electronic device, a non-touch-sensitive component of an electronic device, a surface of a household appliance, a surface of a vehicle component, or the like.

Another type of coated article can include a glass or glass-ceramic substrate, and an oleophilic coating having an average thickness of less than or equal to about 100 nanometers disposed on at least a portion of a surface of the glass or glass-ceramic substrate. The oleophilic coating can include a partially-cured siloxane having a plurality of pendant hydroxyl groups. A concentration of the pendant hydroxyl groups in the partially-cured siloxane of the oleophilic coating can be at least about 25 percent of a concentration of any pendant hydrogen and hydrocarbon groups in the partially-cured siloxane.

A contact angle between a drop of oleic acid and the oleophilic coating can be about 20° to about 40°. A contact angle between a drop of ethylene glycol and the oleophilic coating can be about 45° to about 65°. A contact angle between a drop of hexadecane and the oleophilic coating can be about 15° to about 30°. A contact angle between a drop of water and the oleophilic coating can be about 70° to about 100°.

In some implementations of this type of coated article, there can be an intermediate layer that is interposed between the glass or glass-ceramic substrate and the oleophilic coating. The intermediate layer can include a reflection-resistant coating, a glare-resistant coating, a color-providing composition, or the like.

With respect to the substrate of this type of coated article, in some cases, it can be formed from a silicate glass, borosilicate glass, aluminosilicate glass, boroaluminosilicate glass, or similar glass. In other cases, the substrate can be formed from a glass-ceramic comprising a glassy phase and a ceramic phase, where the ceramic phase includes β-spodumene, β-quartz, nepheline, kalsilite, carnegieite, or a similar ceramic material. In some applications, the glass or glass-ceramic substrate can have an average thickness of less than or equal to about 2 millimeters.

In certain implementations of this type of method, the concentration of the pendant hydroxyl groups in the partially-cured siloxane of the oleophilic coating is greater than or equal to the concentration of any pendant hydrogen and hydrocarbon groups in the partially-cured siloxane.

According to a Wu model, a polar component of a surface energy, a disperse component of the surface energy, and a total surface energy of the coated article can be about 6 milliJoules per square meter to about 15 milliJoules per square meter, about 20 milliJoules per square meter to about 30 milliJoules per square meter, and about 26 milliJoules per square meter to about 45 milliJoules per square meter, respectively.

According to a Fowkes model, a polar component of a surface energy, a disperse component of the surface energy, and a total surface energy of the coated article can be about 4 milliJoules per square meter to about 10 milliJoules per square meter, about 20 milliJoules per square meter to about 35 milliJoules per square meter, and about 24 milliJoules per square meter to about 45 milliJoules per square meter, respectively.

According to an Owens-Wendt model, a polar component of a surface energy, a disperse component of the surface energy, and a total surface energy of the coated article can be about 5 milliJoules per square meter to about 10 milliJoules per square meter, about 20 milliJoules per square meter to about 30 milliJoules per square meter, and about 25 milliJoules per square meter to about 40 milliJoules per square meter, respectively.

This type of coated article can have a first optical transmittance and a first haze after a first touch-and-wipe cycle (where each touch-and-wipe cycle includes tactilely contacting a portion of the coated article with a tactilely-transferred residue or other undesirable residue and subsequently tactilely wiping at least the portion) and a second optical transmittance and a second haze after undergoing a number of touch-and-wipe cycles, such that the first optical transmittance and the second optical transmittance can be substantially similar and/or the first haze and the second haze can be substantially similar when the number of touch-and-wipe cycles is at least 20. For example, in some situations, the second optical transmittance can be within 3 percent of the first optical transmittance when the number of touch-and-wipe cycles is at least 20 and/or the second haze can be within 5 percent of the first haze when the number of touch-and-wipe cycles is at least 20.

Similarly, a mass of tactilely-transferred residue remaining on the coated article after at least 20 touch-and-wipe cycles can be substantially similar to a mass of tactilely-transferred residue remaining on the coated article after the first touch-and-wipe cycle. For example, it is possible for the mass of tactilely-transferred residue remaining on the coated article after at least 20 touch-and-wipe cycles to be within 0.4 milligrams of the mass of tactilely-transferred residue remaining on the coated article after the first touch-and-wipe cycle.

In certain implementations of this type of coated article, wherein the glass or glass-ceramic substrate is a chemically strengthened glass or glass-ceramic substrate comprising a layer under compression that extends from the surface of the glass or glass-ceramic substrate inward to a selected depth. In such implementations, a compressive stress of the layer under compression can be about 400 megaPascals to about 1200 megaPascals, and the depth of the layer under compression can be about 30 micrometers to about 80 micrometers.

Applications for, or uses of, this type of coated article include forming a portion of a touch-sensitive display screen or cover plate for an electronic device, a non-touch-sensitive component of an electronic device, a surface of a household appliance, a surface of a vehicle component, or the like.

Yet another type of coated article can include a chemically-strengthened alkali aluminosilicate glass substrate having a layer under compression that extends from a surface of the glass or glass-ceramic substrate inward to a selected depth, and a partially-cured methyl siloxane oleophilic coating having an average thickness of less than or equal to about 50 nanometers disposed directly on at least a portion of a surface of the chemically-strengthened alkali aluminosilicate glass substrate. The partially-cured methyl siloxane oleophilic coating of type of coated article can have a plurality of pendant hydroxyl groups, such that a concentration of the pendant hydroxyl groups in the partially-cured methyl siloxane of the oleophilic coating is at least about 50 percent of a concentration of any pendant hydrogen and methyl groups in the partially-cured methyl siloxane. This type of coated article can have a first optical transmittance and a first haze after a first touch-and-wipe cycle (where each touch-and-wipe cycle includes tactilely contacting a portion of the coated article with a tactilely-transferred residue and subsequently tactilely wiping at least the portion) and a second optical transmittance and a second haze after undergoing a number of touch-and-wipe cycles, such that the first optical transmittance and the second optical transmittance are within 2 percent when the number of touch-and-wipe cycles is at least 20 and the first haze and the second haze are within 3 percent when the number of touch-and-wipe cycles is at least 20.

With this type of article, a mass of tactilely-transferred residue remaining on the coated article after at least 20 touch-and-wipe cycles can be within 0.3 milligrams of a mass of tactilely-transferred residue remaining on the coated article after the first touch-and-wipe cycle.

A contact angle between a drop of oleic acid and the oleophilic coating can be about 25° to about 32°, a contact angle between a drop of ethylene glycol and the oleophilic coating is about 52° to about 60°, a contact angle between a drop of hexadecane and the oleophilic coating is about 21° to about 28°, and/or a contact angle between a drop of water and the oleophilic coating is about 77° to about 82°.

One type of method for making a coated article can includes forming an oleophilic coating having an average thickness of less than or equal to about 100 nanometers on at least a portion of a surface of a glass or glass-ceramic substrate.

In certain cases, the method can further include forming an intermediate layer on at least a portion of the surface of the glass or glass-ceramic substrate prior to forming the oleophilic coating, wherein the intermediate layer includes a reflection-resistant coating, a glare-resistant coating, or a color-providing composition.

In certain implementations, the forming step comprises forming a partially-cured siloxane comprising a plurality of pendant hydroxyl groups, wherein a concentration of the pendant hydroxyl groups in the partially-cured siloxane of the oleophilic coating is at least about 25 percent of a concentration of any pendant hydrogen and hydrocarbon groups in the partially-cured siloxane.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
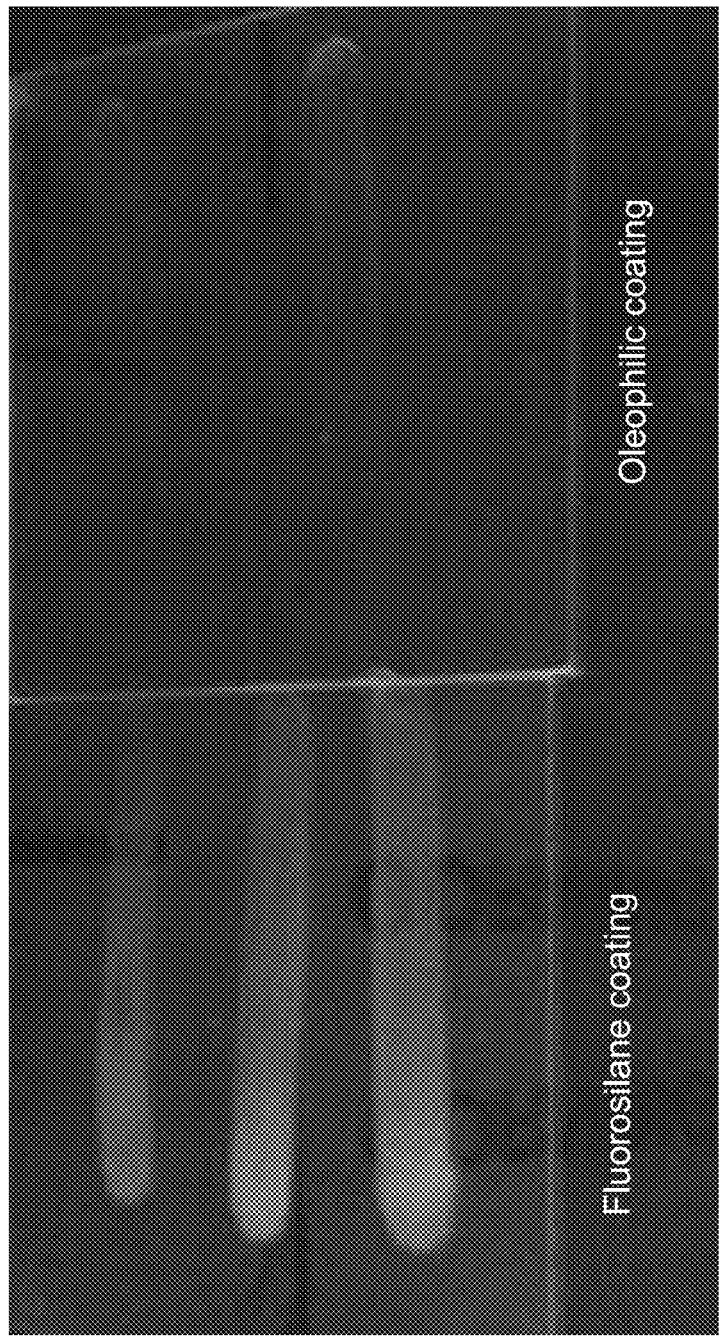
FIG. 1 illustrates the visual smudge characteristics of two coated glass articles as seen under standard lighting conditions in accordance with EXAMPLE 6.

These and other aspects, advantages, and salient features will become apparent from the following detailed description, the accompanying drawings, and the appended claims.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Described herein are various articles that have improved resistance to the adverse effects observed when tactilely-transferred residue is smudged, along with methods for their manufacture and use. The improved articles generally include a glass or glass-ceramic substrate and an oleophilic coating disposed directly or indirectly thereon. The oleophilic coatings, which can be hydrophobic or hydrophilic, beneficially provide the articles with improved smudge resistance relative to similar or identical articles that lack the oleophilic coating. In addition, and as will be described in more detail below, the coated articles can exhibit high transmission, low haze, and high durability, among other features, both before and after application of tactilely-transferred residue thereto.

As used herein, the terms "anti-smudge" or "smudge-resistant" generally refer to the ability of a surface having tactilely-transferred residue contained thereon to resist the visible smudging or smearing of the existing tactilely-transferred residue during subsequent user contact with the surface by hiding/obscuring the tactilely-transferred residue on the surface and/or by removing the tactilely-transferred residue from the surface. Therefore, a smudge-resistant surface must at least partially enable tactilely-transferred residue to be transferred thereto.

In addition, the term "oleophilic" is used herein to refer to a material that imparts a wetting characteristic such that the contact angle between oleic acid and a surface formed from the material is less than 90 degrees)(°). Analogously, the term "hydrophilic" is used herein to refer to a material that imparts a wetting characteristic such that the contact angle between water and a surface formed from the material is less than 90°. In contrast, the term "hydrophobic" is used herein to refer to a material that imparts a wetting characteristic such that the contact angle between water and a surface formed from the material is greater than 90°.

Further, the term "tactilely-transferred residue" is used herein for convenience to generically refer to and encompass any undesirable residue that is contacted with, and transferred to, a surface by a given user. This includes natural human-oils or grease, as well as any other materials coupled therewith (e.g., dirt, cosmetics, food particles, hand creams/lotions, or the like) that are contacted with, and transferred to, the surface via a finger, palm, wrist, forearm/elbow (e.g., when an appliance door is closed or otherwise manipulated by a forearm or an elbow), or other body part.

As stated above, the substrate on which the oleophilic coating is directly or indirectly disposed can comprise a glass or glass-ceramic material. The choice of glass or glass-ceramic material is not limited to a particular composition, as improved smudge-resistance can be obtained using a variety of glass or glass-ceramic compositions. For example, with respect to glasses, the material chosen can be any of a wide range of silicate, borosilicate, aluminosilicate, or boroaluminosilicate glass compositions, which optionally can comprise one or more alkali and/or alkaline earth modifiers. By way of illustration, one such glass composition includes the following constituents: 58-72 mole percent (mol %) $SiO_2$; 9-17 mol % $Al_2O_3$; 2-12 mol % $B_2O_3$; 8-16 mol % $Na_2O$; and 0-4 mol % $K_2O$, wherein the ratio $$\frac{Al_2O_3(\text{mol }\%) + B_2O_3(\text{mol }\%)}{\sum \text{modifiers (mol \%)}} > 1,$$

where the modifiers comprise alkali metal oxides. Another glass composition includes the following constituents: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. Another illustrative glass composition includes the following constituents: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 parts per million (ppm) $As_2O_3$; and less than 50 ppm $Sb_2O_3$; wherein 12 mol % $Li_2O+Na_2O+K_2O \leq 20$ mol % and 0 mol % MgO+CaO$\leq 10$ mol %. Another illustrative glass composition includes the following constituents: 55-75 mol % SiO2, 8-15 mol % $Al_2O_3$, 10-20 mol % $B_2O_3$; 0-8% MgO, 0-8 mol % CaO, 0-8 mol % SrO and 0-8 mol % BaO. Yet another illustrative glass composition includes the following constituents: at least one of $Al_2O_3$ or $B_2O_3$ and at least one of an alkali metal oxide or an alkali earth metal oxide, wherein $-15$ mol % $(R_2O+R'O-Al_2O_3-ZrO_2)-B_2O_3 \leq 4$ mol %, where R can be Li, Na, K, Rb, and/or Cs, and R' can be Mg, Ca, Sr, and/or Ba. For example, one specific composition of this type includes from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. Yet another illustrative glass composition includes the following constituents: $SiO_2$, $Al_2O_3$, $P_2O_5$, and at least one alkali metal oxide ($R_2O$), wherein $0.75 \leq [(P_2O_5 \text{ (mol \%)} + R_2O \text{ (mol \%)})/M_2O_3 \text{ (mol \%)}] \leq 1.2$, where $M_2O_3 = Al_2O_3 + B_2O_3$. Yet another illustrative glass composition includes the following constituents: at least about 4 mol % $P_2O_5$, wherein $(M_2O_3 \text{ (mol \%)}/R_xO \text{(mol \%)}) < 1$, wherein $M_2O_3 = Al_2O_3 + B_2O_3$, and wherein $R_xO$ is the sum of monovalent and divalent cation oxides present in the glass. Still another illustrative glass composition includes the following constituents: at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein $0 \leq \text{MgO}+\text{ZnO} \leq 6$; and, optionally, at least one of CaO, BaO, and SrO, wherein 0 mol %$\leq$CaO+SrO+BaO$\leq 2$ mol %.

Similarly, with respect to glass-ceramics, the material chosen can be any of a wide range of materials having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite.

The glass or glass-ceramic substrate can adopt a variety of physical forms. That is, from a cross-sectional perspective, the substrate can be flat or planar, or it can be curved and/or sharply-bent. Similarly, it can be a single unitary object, or a multi-layered structure or laminate. Further, the substrate optionally can be annealed and/or strengthened (e.g., by thermal tempering, chemical ion-exchange, or like processes).

The oleophilic coating that is disposed, either directly or indirectly, on at least a portion of a surface of the substrate can be formed from a variety of materials, termed "coating precursor materials" herein for convenience only. The coating precursor material and the final oleophilic coating generally can include an organic component to provide the requisite oleophilicity, as well as an inorganic component to provide the ability to strongly bond to the surface of the glass or glass-ceramic substrate. The coating precursor material, and, by extension, the final oleophilic coating produced therefrom, will also be selected such that it imparts other desirable properties (e.g., appropriate levels of haze, transmittance, durability, and the like) to the final coated article both before and after fingerprint residue has been applied thereto.

Exemplary coating precursor materials that can be used to form the oleophilic coating include uncured and partially-cured siloxanes having organic side chains (e.g., silsesquioxanes or silicones). For the purposes of the present disclosure, these coating precursor materials can be designated by the general formula $[-R_2SiO-]_n$, wherein each R in the n repeat groups is independently a hydrogen, hydroxyl, or hydrocarbon group or moiety, with the proviso that not all of the R groups in the n repeat units are hydrogen or hydroxyl. The hydrocarbon group can be a substituted or unsubstituted, linear or branched, chain or cyclic structure having between 1 and 22 carbons. It is important that these materials are not fully cured prior to their application to the substrate, because a fully cured material will not be able to chemically bond to the glass or glass-ceramic substrate, nor be able to be applied thinly. One illustrative class of such coating precursor materials includes partially-cured linear alkyl siloxanes (e.g., partially-cured methyl siloxane, partially-cured ethyl siloxane, partially-cured propyl siloxane, and the like).

When such a coating precursor material is used, the oleophilic coating itself generally will include an at-least-partially-cured siloxane. In many implementations involving an uncured or partially-cured siloxane having organic side chains as the coating precursor material, the final oleophilic coating will be only partially cured. That is, not all of the hydroxyl pendant groups or moieties on the silicon atoms in the coating precursor material will participate in a condensation reaction (i.e., such that they, along with the pendant hydrogen or hydrocarbon "R" groups or moieties of the general structure defined above, are removed from a siloxane unit during the combination of two separate siloxane units).

Indeed, in such implementations, it is desirable for the partially-cured siloxane of the oleophilic coating to include a plurality of pendant hydroxyl groups. Surprisingly, the presence of increased amounts of hydroxyl groups on the silicon atoms in the partially-cured siloxane of the oleophilic coating result in greater oleophilicity than a fully-cured siloxane having essentially no hydroxyl groups on the silicon atoms. Thus, in many of these embodiments, a concentration of pendant hydroxyl groups in the partially-cured siloxane of the oleophilic coating can be at least about 25 percent of the concentration of any pendant hydrogen and hydrocarbon groups in the partially-cured siloxane of the oleophilic coating, when measured for example by nuclear magnetic resonance spectroscopy (NMR). In certain cases, (e.g., when higher extents of oleophilicity are desired) the concentration of pendant hydroxyl groups in the partially-cured siloxane of the oleophilic coating can be at least about 60 percent of the concentration of any pendant hydrogen and hydrocarbon groups in the partially-cured siloxane of the oleophilic coating. Finally, in certain situations (e.g., when even higher extents of oleophilicity are desired) the concentration of pendant hydroxyl groups in the partially-cured siloxane of the oleophilic coating can be greater than or equal to about the concentration of any pendant hydrogen and hydrocarbon groups in the partially-cured siloxane of the oleophilic coating.

In certain embodiments, the coated articles can include a layer interposed between the glass or glass-ceramic substrate and the oleophilic coating material. This intermediate layer can be used to provide additional features to the coated article (e.g., reflection resistance or anti-reflection properties, glare resistance or anti-glare properties, color, opacity, and/or the like) and can cover a portion of the substrate surface or the entire substrate surface on which the oleophilic coating is disposed. In one implementation, the intermediate layer includes a coating of $SiO_2$ nanoparticles bound to at least a portion of the substrate to provide reflection resistance to the final coated article. In another implementation, the intermediate layer might comprise a multi-layered reflection-resistant coating formed from alternating layers of polycrystalline $TiO_2$ and $SiO_2$. In another implementation, the intermediate layer might comprise a color-providing composition that comprises a dye or pigment material.

Methods of making the above-described coated articles generally include the steps of providing a glass or glass-ceramic substrate, and forming the oleophilic coating on at least a portion of a surface of the substrate. In those embodiments where the optional intermediate layer is implemented, however, the methods generally involve an additional step of forming the intermediate layer on at least a portion of a surface of the substrate prior to the formation of the oleophilic coating. It should be noted that when the intermediate layer is implemented, the surface fraction of the substrate that is covered by the oleophilic coating does not have to be the same as the surface fraction covered by the intermediate layer.

The selection of materials used in the glass or glass-ceramic substrates, oleophilic coatings, and optional intermediate layers can be made based on the particular application desired for the final coated article. In general, however, the specific materials will be chosen from those described above for the coated articles.

Provision of the substrate can involve selection of a glass or glass-ceramic object as-manufactured, or it can entail subjecting the as-manufactured glass or glass-ceramic object to a treatment in preparation for forming the optional intermediate layer or the oleophilic coating. Examples of such pre-coating treatments include physical or chemical cleaning, physical or chemical strengthening, physical or chemical etching, physical or chemical polishing, annealing, shaping, and/or the like. Such processes are known to those skilled in the art to which this disclosure pertains.

Once the glass or glass-ceramic substrate has been selected and/or prepared, either the optional intermediate layer or the oleophilic coating can be disposed thereon. Depending on the materials chosen, these coatings can be formed using a variety of techniques. It is important to note that the coatings described herein (i.e., both the optional intermediate layer and the oleophilic coating) are not free-standing films that can be applied (e.g., via an adhesive or other fastening means) to the surface of the substrate, but are, in fact, physically formed on the surface of the substrate.

In general, the optional intermediate layer and/or the oleophilic coating can be fabricated independently using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, or the like. Such processes are known to those skilled in the art to which this disclosure pertains.

In many implementations, the materials used to form optional intermediate layer and/or the oleophilic coating may need to undergo an additional treatment step to finalize these layers. By way of example, in cases when the oleophilic coating precursor material is applied to the substrate in liquid form, it can undergo a thermal or radiation curing step to form the final oleophilic coating. In those situations when the oleophilic coating precursor material is formed from a siloxane material, the curing step is generally a condensation reaction, which results in a structural rearrangement of the individual siloxane units to form a cage- or ladder-like structure. As described above, in many of these cases, the cage- or ladder-like structure will comprise an only partially cured siloxane.

Once the coated article is formed, it can be used in a variety of applications where the coated article will come into contact with fingerprint residue. These applications encompass touch-sensitive display screens or cover plates for various electronic devices (e.g., cellular phones, personal data assistants, computers, tablets, global positioning system navigation devices, and the like), non-touch-sensitive components of electronic devices, surfaces of household appliances (e.g., refrigerators, microwave ovens, stovetops, oven, dishwashers, washers, dryers, and the like), and vehicle components, just to name a few devices that might be tactilely manipulated or accessed.

Given the breadth of potential uses for the improved smudge-resistant coated articles described herein, it should be understood that the specific features or properties of a particular coated article will depend on the ultimate application therefor or use thereof. The following description, however, will provide some general considerations.

There is no particular limitation on the average thickness of the substrate contemplated herein. In many exemplary applications, however the average thickness will be less than or equal to about 15 millimeters (mm). If the coated article is to be used in applications where it may be desirable to optimize thickness for weight, cost, and strength characteristics (e.g., in electronic devices, or the like), then even thinner substrates (e.g., less than or equal to about 5 mm) can be used. By way of example, if the coated article is intended to function as a cover for a touch screen display, then the substrate can exhibit an average thickness of about 0.02 mm to about 2.0 mm.

In contrast to the glass or glass-ceramic substrate, where thickness is not limited, the average thickness of the oleophilic coating should be less than or equal to about 100 nanometers (nm). If the oleophilic coating is much thicker than this, it will have adverse effects on the haze, optical transmittance, scratch resistance, and/or durability of the final coated article. To illustrate, with thinner oleophilic coatings, a potential scratch to the surface can be resisted better by the more durable underlying substrate, because the scratch is actually absorbed by the underlying substrate rather than the coating. If the oleophilic coating is thicker than 100 nm on average, then the scratch will be absorbed by the coating itself and will be visible to the naked eye. Thus, in applications where high scratch resistance is important or critical (in addition to the improved smudge resistance provided by the oleophilic coating), the average thickness of the oleophilic coating should be less than or equal to 75 nm.

The thickness of the intermediate layer will be dictated by its function. For glare and/or reflection resistance for example, the average thickness should be less than or equal to about 200 nanometers. Coatings that have an average thickness greater than this could scatter light in such a manner that defeats the glare and/or reflection resistance properties.

In general, the optical transmittance of the coated article will depend on the type of materials chosen. For example, if a glass or glass-ceramic substrate is used without any pigments added thereto and/or the oleophilic coating is sufficiently thin, the coated article can have a transparency over the entire visible spectrum of at least about 85%. In certain cases where the coated article is used in the construction of a touch screen for an electronic device, for example, the transparency of the coated article can be at least about 92% over the visible spectrum. In situations where the substrate comprises a pigment (or is not colorless by virtue of its material constituents) and/or the oleophilic coating is sufficiently thick, the transparency can diminish, even to the point of being opaque across the visible spectrum. Thus, there is no particular limitation on the optical transmittance of the coated article itself.

Like transmittance, the haze of the coated article can be tailored to the particular application. As used herein, the terms "haze" and "transmission haze" refer to the percentage of transmitted light scattered outside an angular cone of ±4.0° in accordance with ASTM procedure D1003, the contents of which are incorporated herein by reference in their entirety as if fully set forth below. For an optically smooth surface, transmission haze is generally close to zero. In those situations when the coated article is used in the construction of a touch screen for an electronic device, the haze of the coated article can be less than or equal to about 5%.

Similarly, the contact angle exhibited with respect to a variety of fluids and/or the surface energy of the coated article can be tailored to the particular application. As stated above, the term "oleophilic" refers to a material that imparts a wetting characteristic such that the contact angle between oleic acid and a surface formed from the material is less than 90 degrees)(°). Thus, the coated article will exhibit a contact angle with oleic acid (i.e., a contact angle between a drop of oleic acid and a surface thereof) that is less than 90°. In most implementations, however, the contact angle with oleic acid will be about 20° and about 40°.

With respect to other fluids, the coated article will generally exhibit a contact angle with, for example, ethylene glycol (i.e., a contact angle between a drop of ethylene glycol and a surface thereof) that is about 45° to about 65°. In another example, the coated article will generally exhibit a contact angle with hexadecane (i.e., a contact angle between a drop of hexadecane and a surface thereof) that is about 15° to about 30°. In yet another example, the coated article will generally exhibit a contact angle with water (i.e., a contact angle between a drop of water and a surface thereof) that is about 70° to about 100°. For the purposes of the present disclosure, such contact angles represent the average of 15 measurements made using a goniometer, where a droplet of a given fluid (about 2 microliters for water, and about 4 microliters for the organic fluids) is placed on five discrete locations on the surface of a coated article, and three different samples of a given implementation are measured.

The total surface energy of the coated article is determined by taking the sum of the polar energy component and the dispersive energy component. For the purposes of the present disclosure, the surface energy is estimated from contact angle measurements using various test liquids, such as those described immediately above, with varying surface tensions using the KRUSS Drop Shape Analysis program to run a calculation using models such as Wu, Fowkes, and Owens-Wendt. When calculating the surface energy according to each of these models, the software calculates the polar component of the surface energy, the disperse component of the surface energy, and the total surface energy according to each model using the parameters for these models established by the software program. These estimates are recorded for each sample, and an average value across 5 samples is reported. In general, according to the Wu model, the polar component of the surface energy, the disperse component of the surface energy, and the total surface energy of the coated articles described herein will generally be about 6 to about 15 milliJoules per square meter ($mJ/m^2$), about 20 to about 30 $mJ/m^2$, and about 26 to about 45 $mJ/m^2$, respectively. Similarly, according to the Fowkes model, the polar component of the surface energy, the disperse component of the surface energy, and the total surface energy of the coated articles described herein will generally be about 4 to about 10 mJ/m², about 20 to about 35 mJ/m², and about 24 to about 45 mJ/m², respectively. In addition, according to the Owens-Wendt model, the polar component of the surface energy, the disperse component of the surface energy, and the total surface energy of the coated articles described herein will generally be about 5 to about 10 mJ/m², about 20 to about 30 mJ/m², and about 25 to about 40 mJ/m², respectively.

In implementations where the glass or glass-ceramic substrate is strengthened, the substrate will have a layer under compression that extends from a surface of the substrate itself inward to a selected depth. While each surface of the coated article's substrate can have a layer under compression, for the purposes of the present disclosure, when a substrate is described as having such a layer, the surface of reference is at least that on which the oleophilic coating is disposed. The compressive stress (CS) of the layer under compression, and the depth of this layer (DOL) can be measured using a glass or glass-ceramic surface stress meter, which is an optical tool that generally uses the photoelastic constant and index of refraction of the substrate material itself, and converts the measured optical interference fringe patterns to specific CS and DOL values. In those situations when the coated article is used in the construction of a touch screen for an electronic device, the CS and DOL of the coated article generally can be, respectively, about 400 megaPascals (MPa) to about 1200 MPa and about 30 micrometers (μm) to about 80 μm. Importantly, in many implementations, the CS and DOL each do not change by more than about 5 percent after the oleophilic coating (including any optional intermediate layer(s)) is disposed thereon.

Regardless of the application or use, the coated articles described herein offer improved smudge-resistance relative to identical articles that lack the oleophilic coatings described herein. While smudge resistance can appear to be a qualitative and potentially subjective characterization, there are a number of quantifiable indications of smudge-resistance, examples of which will now be described.

One quantifiable indication of this improved smudge resistance can be seen in the net change in the amount of tactilely-transferred residue that is transferred from a user to the article during use and that remains after wiping the tactilely-transferred residue over time. That is, when a user tactilely interacts with the coated article, some amount of tactilely-transferred residue will transfer to the article. When the same region of the coated article is subsequently smudged or wiped by further user interaction (and not with a cloth-like material), some of the tactilely-transferred residue is smeared over the coated article and some other tactilely-transferred residue might be added, while some is removed from the coated article. The mass of the tactilely-transferred residue remaining on the coated article after each so-called "touch-and-wipe cycle" can be quantified, for example, by weighing the mass thereof.

Given that any particular tactile interaction will involve any of a variety of different residue components/compositions, and that the applied touch and wipe pressures can vary with each user, the change in the amount of tactilely-transferred residue over time can be measured, compared, and analyzed using a standardized comparative procedure. For the purposes of the present disclosure, this procedure first entails the use of a model fingerprint applicator, formed from a fingerprint stamp, to apply a commercially available synthetic sebum to the coated article at a pressure of about 3 pounds per square inch (psi). This is followed by wiping the applied "fingerprint" using a Crockmeter or a linear abrader fitted with a Crockmeter kit. The wiping step is a modification of the Crockmeter test that is described in ASTM test procedure F1319-94, entitled "Standard Test Method for Determination of Abrasion and Smudge Resistance of Images Produced from Business Copy Products," the contents of which are incorporated herein by reference in their entirety as if fully set forth below. Specifically, the Crockmeter or linear abrader subjects the coated article to direct contact with a Crockmeter rubbing tip or "finger" mounted on the end of a weighted arm. Rather than using a standard crocking cloth, the tactile contact is simulated by a "finger" fitted with a portion of a nitrile laboratory glove. The wiping step involves contacting the finger with the region of the coated article having the synthetic sebum-containing fingerprint with a pressure of about 0.93 psi, and moving the finger back-and-forth across the length of the coated article. After each touch-and-wipe cycle of this procedure, the mass of the coated article is recorded and compared with the mass of the coated article prior to the first touch-and-wipe cycle.

In contrast to existing technologies, the amount of fingerprint residue that remains on the coated articles described herein after a given touch-and-wipe cycle (e.g., after 5, 10, 50, 100, or more cycles) can be substantially similar to, or even less than, the amount of fingerprint residue that remains on the coated articles after a first touch-and-wipe cycle, as measured using the above-described procedure. In other words, the coated articles herein resist any significant buildup of visible residue during use. For example, in certain implementations, the change in fingerprint residue remaining on the coated articles described herein after 20 touch-and-wipe cycles, relative to the first cycle, can be about ±0.4 milligrams (mg). In other implementations, the change in fingerprint residue remaining on the coated articles described herein after 20 touch-and-wipe cycles, relative to the first cycle, can be about ±0.1 mg.

Another quantifiable indication of the improved smudge resistance is the change in haze that is observed over time. This change can be measured using the touch-and-wipe procedure described above, with the exception that, rather than recording the mass of the coated article, the haze of the coated article is measured after each cycle of interest. In general, the overall haze of the coated articles described herein after a given touch-and-wipe cycle can be substantially similar to, or even less than, the haze of the coated articles after the first touch-and-wipe cycle. Again, this indicates that the coated substrates and methods herein prevent any significant buildup of visible residue and its deleterious smudge characteristics during continued use and would tend to obviate or lessen a need for repeated and inconvenient cleaning by the user. In certain implementations, the net change in the haze of the coated articles described herein after 20 touch-and-wipe cycles, relative to the first cycle, can be about ±5%. In other implementations, the net change in the haze of the coated articles described herein after 20 touch-and-wipe cycles, relative to the first cycle, can be about ±2%.

Still another quantifiable indication of the improved smudge resistance is the change in optical transmittance that is observed over time. This change can be measured using the touch-and-wipe procedure described above, with the exception that, rather than recording the mass of the coated article, the optical transmittance of the coated article is measured after each cycle of interest. In general, the overall transmittance of the coated articles described herein after a given touch-and-wipe cycle can be substantially similar to, or even higher than, the optical transmittance of the coated articles after the first touch-and-wipe cycle. In certain implementations, the net change in the transmittance of the coated articles described herein after 20 touch-and-wipe cycles, relative to the first cycle, can be about ±3%. In other implementations, the net change in the transmittance of the coated articles described herein after 20 touch-and-wipe cycles, relative to the first cycle, can be about ±0.5%.

In a specific embodiment that might be particularly advantageous for applications such as touch accesses or operated electronic devices, a smudge resistant coated article is formed from a chemically strengthened (ion exchanged) alkali aluminosilicate flat glass sheet. The CS and DOL of the coated article can be, respectively, about 600 MPa to about 1000 MPa and about 40 μm to about 70 μm. The oleophilic coating is formed from a partially-cured methyl siloxane coating precursor, and is directly coated on one surface of the glass sheet. The average thickness of the glass sheet is less than or equal to about 1 mm, and the average thickness of the methyl siloxane oleophilic coating is less than or equal to about 50 nm. The formed methyl siloxane oleophilic coating can have a concentration of pendant hydroxyl groups that is at least about 50 percent of the concentration of any pendant hydrogen and methyl groups therein. After formation of the oleophilic coating, the CS and DOL of the coated article change less than about 3% and about 1%, respectively.

Such a coated article can be used in the fabrication of a touch screen display for an electronic device. The coated article can have an initial optical transmittance of at least about 94% and a haze of less than 0.1%. The coated article can also have a contact angle with oleic acid that is about 25° and about 32°. The coated article can also exhibit a contact angle with ethylene glycol that is about 52° to about 60°. The coated article can also exhibit a contact angle with hexadecane that is about 21° to about 28°. The coated article can also exhibit a contact angle with water that is about 77° to about 82°.

According to the Wu model, the polar component of the surface energy, the disperse component of the surface energy, and the total surface energy of this type of coated articles can be about 8 to about 14 mJ/m$^2$, about 22 to about 26 mJ/m$^2$, and about 30 to about 40 mJ/m$^2$, respectively. According to the Fowkes model, the polar component of the surface energy, the disperse component of the surface energy, and the total surface energy of this type of coated article can be about 5 to about 8 mJ/m$^2$, about 22 to about 26 mJ/m$^2$, and about 25 to about 33 mJ/m$^2$, respectively. According to the Owens-Wendt model, the polar component of the surface energy, the disperse component of the surface energy, and the total surface energy of the coated articles described herein will generally be about 6 to about 9 mJ/m$^2$, about 22 to about 25 mJ/m$^2$, and about 27 to about 34 mJ/m$^2$, respectively.

During operation, the coated article can exhibit high smudge resistance in that a change in fingerprint residue remaining on the coated article after 20 touch-and-wipe cycles, relative to the first cycle, can be about ±0.3 mg. In addition, the net change in the haze of the coated article after 20 touch-and-wipe cycles, relative to the first cycle, can be about ±3%. Further, the net change in the transmittance of the coated article after 20 touch-and-wipe cycles, relative to the first cycle, can be about ±2%.

In another specific embodiment, a smudge resistant coated article is formed from a chemically strengthened (ion-exchanged) alkali aluminosilicate flat glass sheet. The CS and DOL of the coated article can be, respectively, about 600 MPa to about 1000 MPa and about 40 μm to about 70 μm. A reflection resistant layer, formed from $SiO_2$ nanoparticles having an average diameter of about 20 nm, is coated directly on one surface of the glass sheet. The oleophilic coating is formed from a partially-cured methyl siloxane coating precursor, and is directly coated on the reflection resistant layer as a conformal coating. The average thickness of the glass sheet is less than or equal to about 1 mm, the average thickness of the reflection resistant layer is less than or equal to about 50 nm, and the average thickness of the methyl siloxane oleophilic coating is less than or equal to about 50 nm. The formed methyl siloxane oleophilic coating can have a concentration of pendant hydroxyl groups that is at least about 50 percent of the concentration of any pendant hydrogen and methyl groups therein. After formation of the oleophilic coating, the CS and DOL of the coated article change less than about 3% and about 1%, respectively.

Such a coated article can also be used in the fabrication of a touch screen display for an electronic device. The coated article can have an initial optical transmittance of at least about 95% and a haze of less than 0.2%. The coated article can also have a contact angle with oleic acid that is about 25° and about 32°. The coated article can also exhibit a contact angle with ethylene glycol that is about 52° to about 60°. The coated article can also exhibit a contact angle with hexadecane that is about 21° to about 28°. The coated article can also exhibit a contact angle with water that is about 77° to about 82°.

According to the Wu model, the polar component of the surface energy, the disperse component of the surface energy, and the total surface energy of this type of coated articles can be about 8 to about 14 mJ/m$^2$, about 22 to about 26 mJ/m$^2$, and about 30 to about 40 mJ/m$^2$, respectively. According to the Fowkes model, the polar component of the surface energy, the disperse component of the surface energy, and the total surface energy of this type of coated article can be about 5 to about 8 mJ/m$^2$, about 22 to about 26 mJ/m$^2$, and about 25 to about 33 mJ/m$^2$, respectively. According to the Owens-Wendt model, the polar component of the surface energy, the disperse component of the surface energy, and the total surface energy of the coated articles described herein will generally be about 6 to about 9 mJ/m$^2$, about 22 to about 25 mJ/m$^2$, and about 27 to about 34 mJ/m$^2$, respectively.

During operation, the coated article can exhibit high smudge resistance in that a change in fingerprint residue remaining on the coated article after 20 touch-and-wipe cycles, relative to the first cycle, can be about ±0.2 mg. In addition, the net change in the haze of the coated article after 20 touch-and-wipe cycles, relative to the first cycle, can be about ±2%. Further, the net change in the transmittance of the coated article after 20 touch-and-wipe cycles, relative to the first cycle, can be about ±1%.

The various embodiments of the present disclosure are further illustrated by the following non-limiting examples.

EXAMPLES

EXAMPLE 1: Fabrication of Partially-Cured Oleophilic Coatings on Flat Glass Substrates In this example, oleophilic coatings were prepared on flat glass substrates. The substrates chosen were chemically strengthened flat glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$.

To form the oleophilic coating, as-received Accuglass® T 11 (111, Honeywell) was diluted in isopropanol to form various solutions ranging from about 25 weight percent (wt %) to about 50 wt % methyl siloxane. These solutions were coated onto samples of the glass sheets using an automated dip-coater. Typically, withdrawal speeds of about 25 millimeters per minute (mm/min) to about 50 mm/min were used to form the coatings. The dip-coated samples were cured by using the following heating cycle: from room temperature, the temperature was ramped up to about 80 degrees Celsius (° C.) at a rate of about 5 degrees Celsius per minute (° C./min), held at temperature for about 30 min, ramped at a rate of about 5° C./min to about 130° C., held at temperature for about 30 min, ramped at a rate of about 5° C./min to between about 180° C. and about 300° C., held at temperature for about 1 hour, and ramped down to room temperature at a rate of 10° C./min in air.

EXAMPLE 2: Fabrication of Anti-Reflection Coatings and Partially-Cured Oleophilic Coatings on Flat Glass Substrates In this example, oleophilic coatings were prepared on anti-reflection-coated flat glass substrates. The substrates chosen were chemically strengthened flat glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$.

To make the anti-reflection coatings, dispersions comprising $SiO_2$ and/or $ZrO_2$ nanoparticles having a range of particle sizes between about 5 nm to about 100 nm in isopropanol or water (Nissan Chemical USA) were applied to samples of the glass sheets using an automated dip-coater. The concentrations of the solutions and withdrawal speed of the anti-reflection coatings were varied to achieve coatings of different thicknesses.

An oleophilic coating was then applied to each sample the using the procedure described in EXAMPLE 1.

EXAMPLE 3: Fabrication of Partially-Cured Oleophilic Coatings on Flat Glass Substrates In this example, oleophilic coatings having anti-reflection components were prepared on flat glass substrates. The substrates chosen were chemically strengthened flat glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$.

Dispersions comprising $SiO_2$ nanoparticles having a size of less than or equal to about 20 nm in isopropanol (Nissan Chemical USA) were mixed into the 50 wt % Accuglass® T 11 (111, Honeywell) solutions as prepared in EXAMPLE 1 such that the final concentration of $SiO_2$ in the solution was about 1 wt %. These solutions were coated onto the glass substrates using the procedure described in EXAMPLE 1.

COMPARATIVE EXAMPLE 4: Fabrication of Fluorosilane Coating on Flat Glass Substrates In this example, fluorosilane-coated glass samples were prepared using the procedures described in commonly-assigned U.S. patent application Ser. No. 12/366,267, entitled "Damage Resistant Glass Article For Use As A Cover Plate In Electronic Devices," the contents of which are incorporated herein by reference in their entirety as if fully set forth below. Specifically, the substrates chosen were chemically strengthened flat glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$. The fluorosilane used was alkoxysilyl perfluoropolyether, which is commercially marketed as Dow Corning DC2604, as an "easy-to-clean" surface coating.

COMPARATIVE EXAMPLE 5: Application of Free-Standing Anti-Fingerprint Films to Flat Glass Substrates In this example, commercially available anti-fingerprint adhesive films were coated onto glass samples. The substrates chosen were chemically strengthened flat glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$. The adhesive films used were those commercially marketed by Steinheil as the SGP Steinheil Ultra Series films for display use.

EXAMPLE 6: Visual Characterization of Coated Glass Samples

In this example, the smudge-resistance of various coated articles that were prepared in accordance with EXAMPLES 1 and 4 was compared. First, actual human fingerprints were applied to each glass sample. Next, the fingerprint residue left behind was wiped in a single direction across the coated articles using the same fingers that were used to transfer the fingerprint residue.

The coated glass samples prepared in accordance with EXAMPLE 1 exhibited significantly better smudge-resistance than those prepared in accordance with COMPARATIVE EXAMPLE 4. FIG. 1 illustrates representative results for this human touch- and wipe procedure under ordinary lighting conditions. As can be seen from FIG. 1, the glass sample having the oleophilic coating of EXAMPLE 1 (i.e., the sample on the right-hand side of FIG. 1) revealed minimal smudging, while the glass sample having the easy-to-clean coating of COMPARATIVE EXAMPLE 4 revealed significant smudging and streaking of the fingerprint residue.

Figure 2:
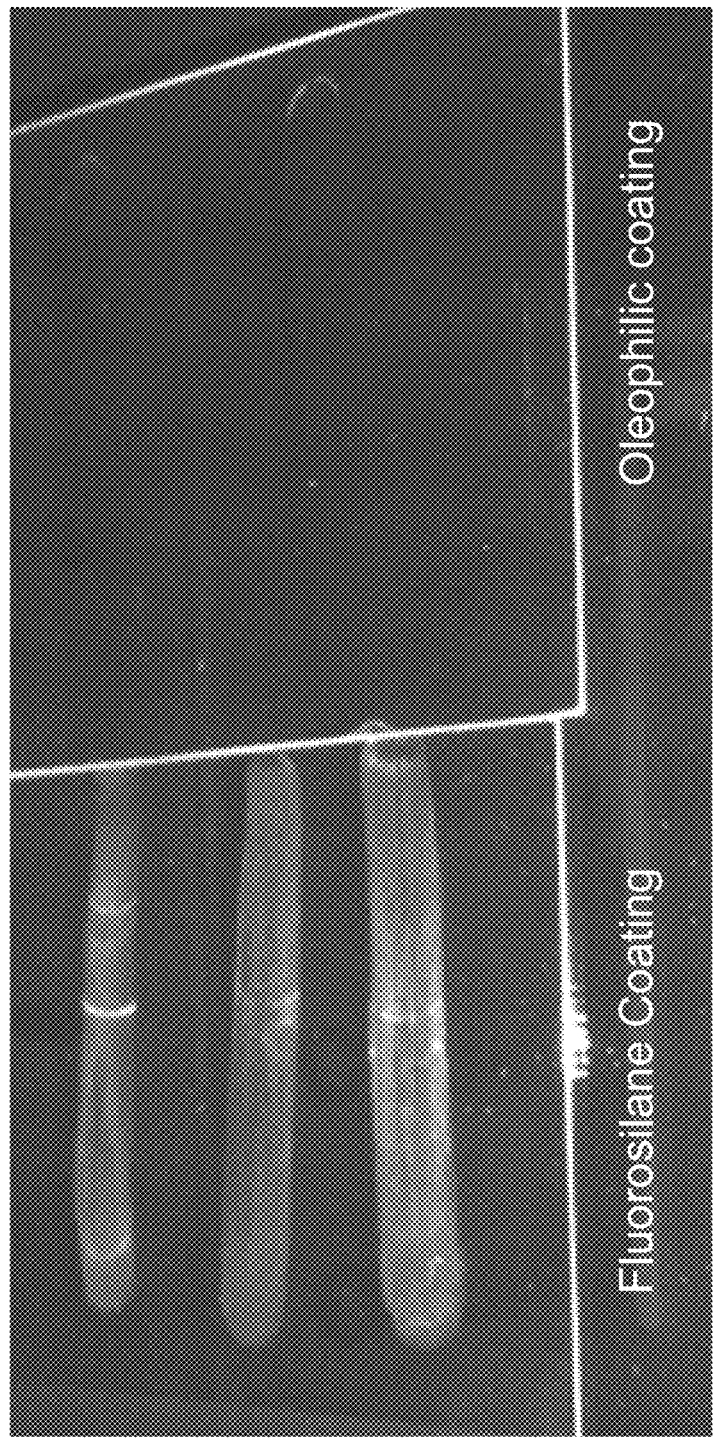
FIG. 2 illustrates the visual smudge characteristics of two coated glass articles as seen under an ultraviolet lamp in accordance with EXAMPLE 6.

This visual comparison was also made under ultraviolet light, the results of which are shown in FIG. 2. As seen in FIG. 2, the glass sample having the oleophilic coating of EXAMPLE 1 (i.e., the sample on the right-hand side of FIG. 2) revealed minimal smudging, while the glass sample having the easy-to-clean coating of COMPARATIVE EXAMPLE 4 revealed significant smudging and streaking of the fingerprint residue.

Thus, the oleophilic coating of EXAMPLE 1 performed significantly better than the easy-to-clean coating of COMPARATIVE EXAMPLE 4 from a visual perspective.

EXAMPLE 7: Mass Transfer, Haze, and Visual Characterization of Coated Glass Samples In this example, the smudge-resistance of various coated articles that were prepared in accordance with EXAMPLES 1, 2, 4, and 5 was compared. The comparison included a fingerprint residue transfer analysis over time, a haze analysis over time, and a visual analysis over time.

The sample of EXAMPLE 1 that was characterized was a glass article coated with an oleophilic coating formed from an about 25 wt % methyl siloxane solution. For convenience, this sample is described as "25% T-111" in this example.

Two samples from EXAMPLE 2 were characterized. The first was a glass article initially coated with an anti-reflection coating comprising about 100 nm $SiO_2$ particles, and subsequently coated with an oleophilic coating formed from an about 25 wt % methyl siloxane solution. For convenience, this sample is described as "100 nm $SiO_2$ w/25% T-111" in this example. The second sample was a glass article initially coated with an anti-reflection coating comprising about 50 nm $SiO_2$ particles, and subsequently coated with an oleophilic coating formed from an about 25 wt % methyl siloxane solution. For convenience, this sample is described as "50 nm $SiO_2$ w/25% T-111" in this example.

The sample of COMPARATIVE EXAMPLE 4 that was characterized was prepared as described therein, and, for convenience, will be described as "EC" in this example.

The sample of COMPARATIVE EXAMPLE 5 that was characterized was prepared as described therein, and, for convenience, will be described as "SGP" in this example.

The net change in the amount of fingerprint residue that was transferred to the coated articles over time was measured using the touch-and-wipe procedure described hereinabove. Again, this procedure first entails the use of a model fingerprint applicator, formed from a polyvinylsiloxane-based, high precision impression material (President JET plus) fingerprint stamp, to apply synthetic sebum to the coated article at about 3 pounds per square inch (psi). This is followed by wiping the applied "fingerprint" using a Crockmeter or a linear abrader fitted with a Crockmeter kit. The wiping step is a modification of the Crockmeter test that is described in ASTM test procedure F1319-94, entitled "Standard Test Method for Determination of Abrasion and Smudge Resistance of Images Produced from Business Copy Products," the contents of which are incorporated herein by reference in their entirety as if fully set forth below. Specifically, the Crockmeter or linear abrader subjects the coated article to direct contact with a Crockmeter rubbing tip or "finger" mounted on the end of a weighted arm. Rather than using a standard crocking cloth, the "finger" is fitted with a portion of a nitrile laboratory glove. The wiping step involves contacting the finger with the region of the coated article having the synthetic sebum-containing fingerprint with a pressure of about 0.93 psi, and moving the finger back-and-forth across the coated article. After each touch-and-wipe cycle of this procedure, the weight of the coated article is recorded and compared with the weight of the coated article prior to the first touch-and-wipe cycle.

Figure 3:
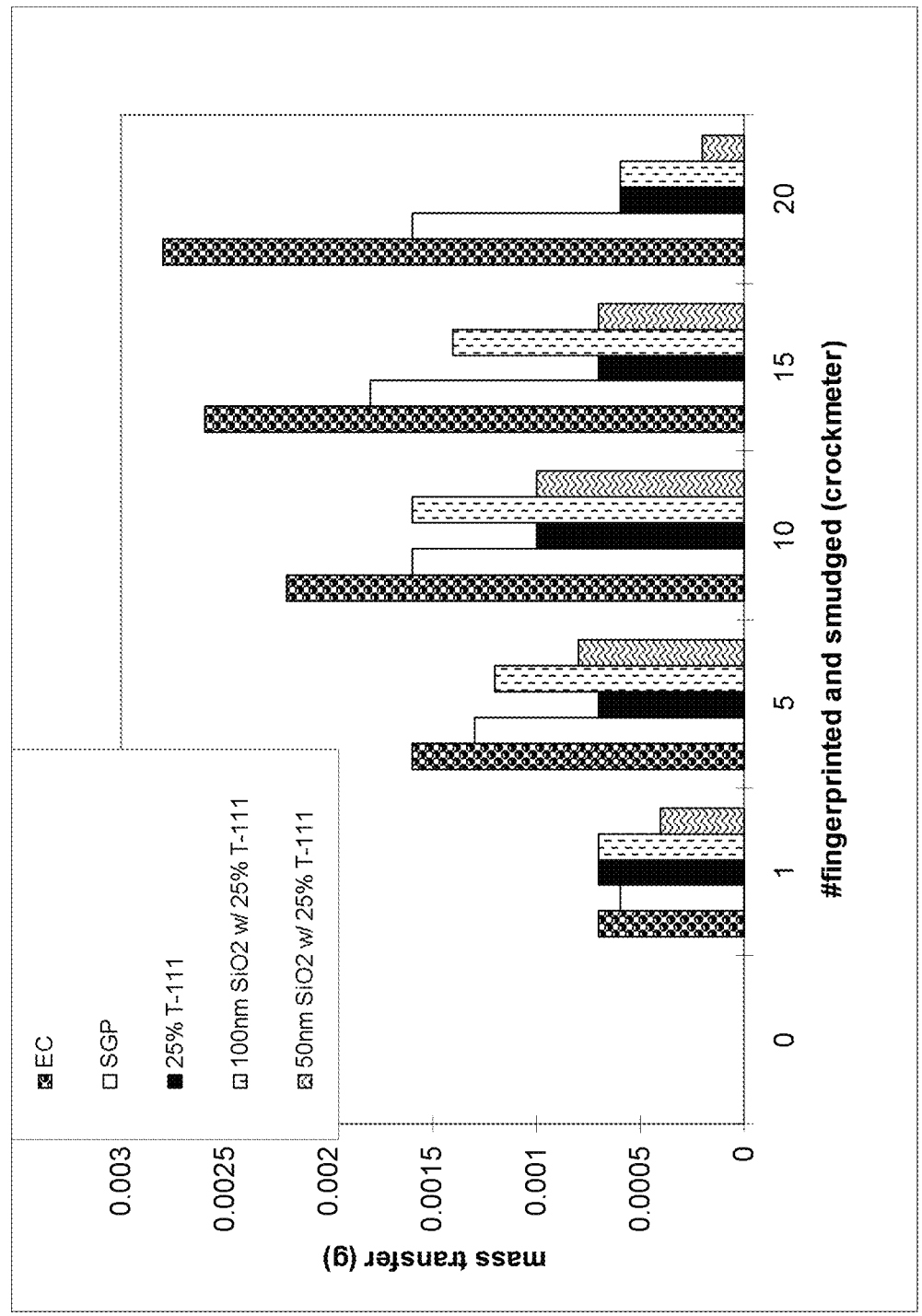
FIG. 3 is a graphical representation of the amount of synthetic fingerprint residue mass that was transferred to various coated glass articles relative to the number of touch-and-wipe cycles performed thereon in accordance with EXAMPLE 7.

The results of the fingerprint residue mass transfer analysis can be seen in FIG. 3, which plots the mass transferred to the coated articles vs. the number of touch-and-wipe cycles. As shown in the graph of FIG. 3, the EC and SGP samples retained the most fingerprint residue over time. In addition, these samples experienced the greatest changes in fingerprint residue mass transfer after each touch-and-wipe cycle relative to the first cycle. In contrast, after 20 touch-and-wipe cycles, the change in fingerprint residue mass transfer for the 25% T-111, 100 nm $SiO_2$ w/25% T-111, and 50 nm $SiO_2$ w/25% T-111 samples was minimal.

Figure 4:
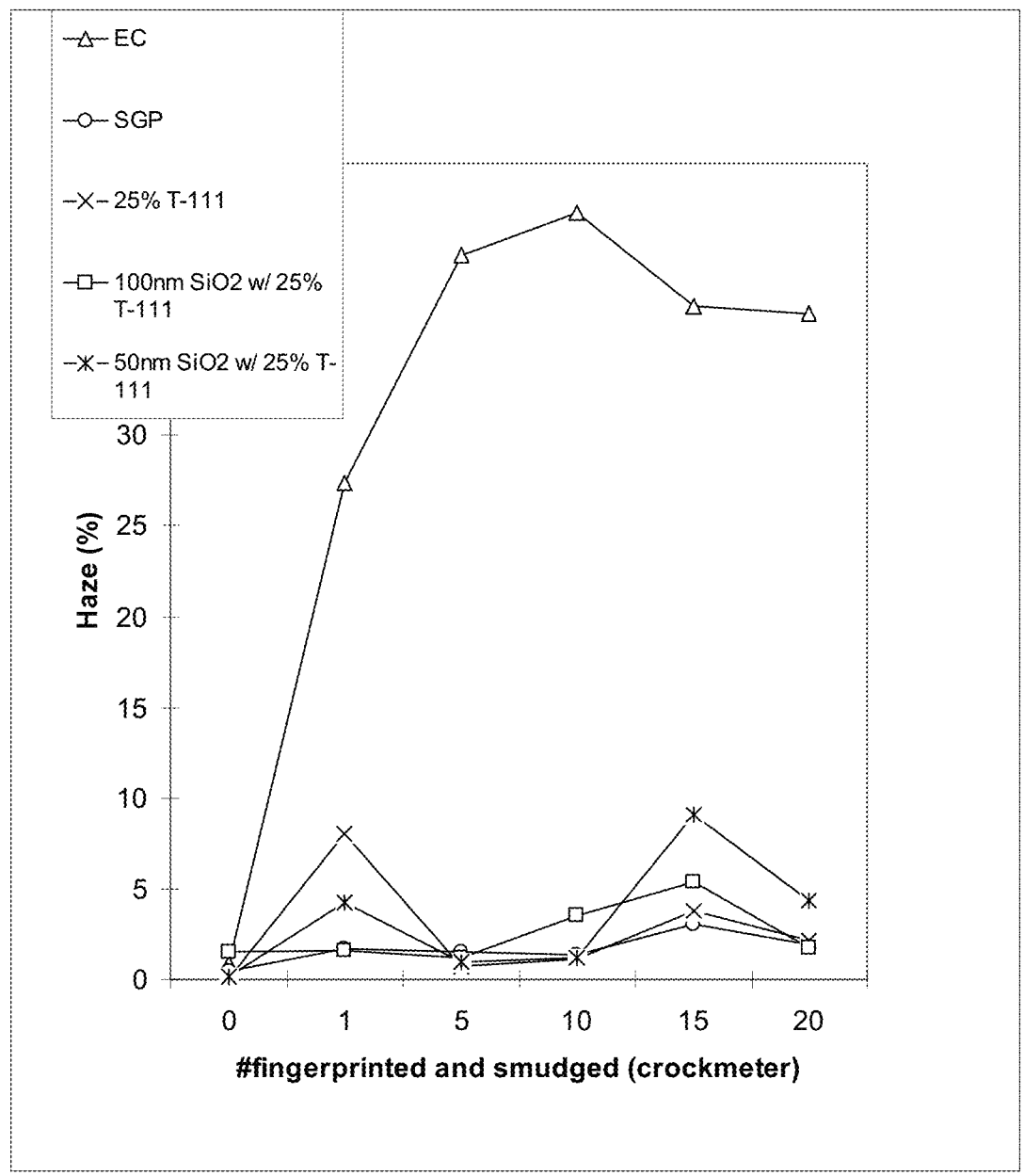
FIG. 4 is a graphical representation of the haze of various coated glass articles relative to the number of touch-and-wipe cycles performed thereon in accordance with EXAMPLE 7.

In addition, the change in haze over time was measured for each of these samples. This change was measured using the touch-and-wipe procedure described hereinabove, with the exception that, rather than recording the weight of the coated articles, their haze was measured after each cycle of interest. The results of the haze analysis can be seen in FIG. 4, which plots the haze of the coated articles vs. the number of touch-and-wipe cycles. As shown in the graph of FIG. 4, the EC sample exhibited the highest haze over time. In addition, this sample experienced the greatest change in haze after each touch-and-wipe cycle relative to the first cycle. In contrast, after 20 touch-and-wipe cycles, the change in haze for the SGP, 25% T-111, 100 nm $SiO_2$ w/25% T-111, and 50 nm $SiO_2$ w/25% T-111 samples was minimal.

Figure 5:
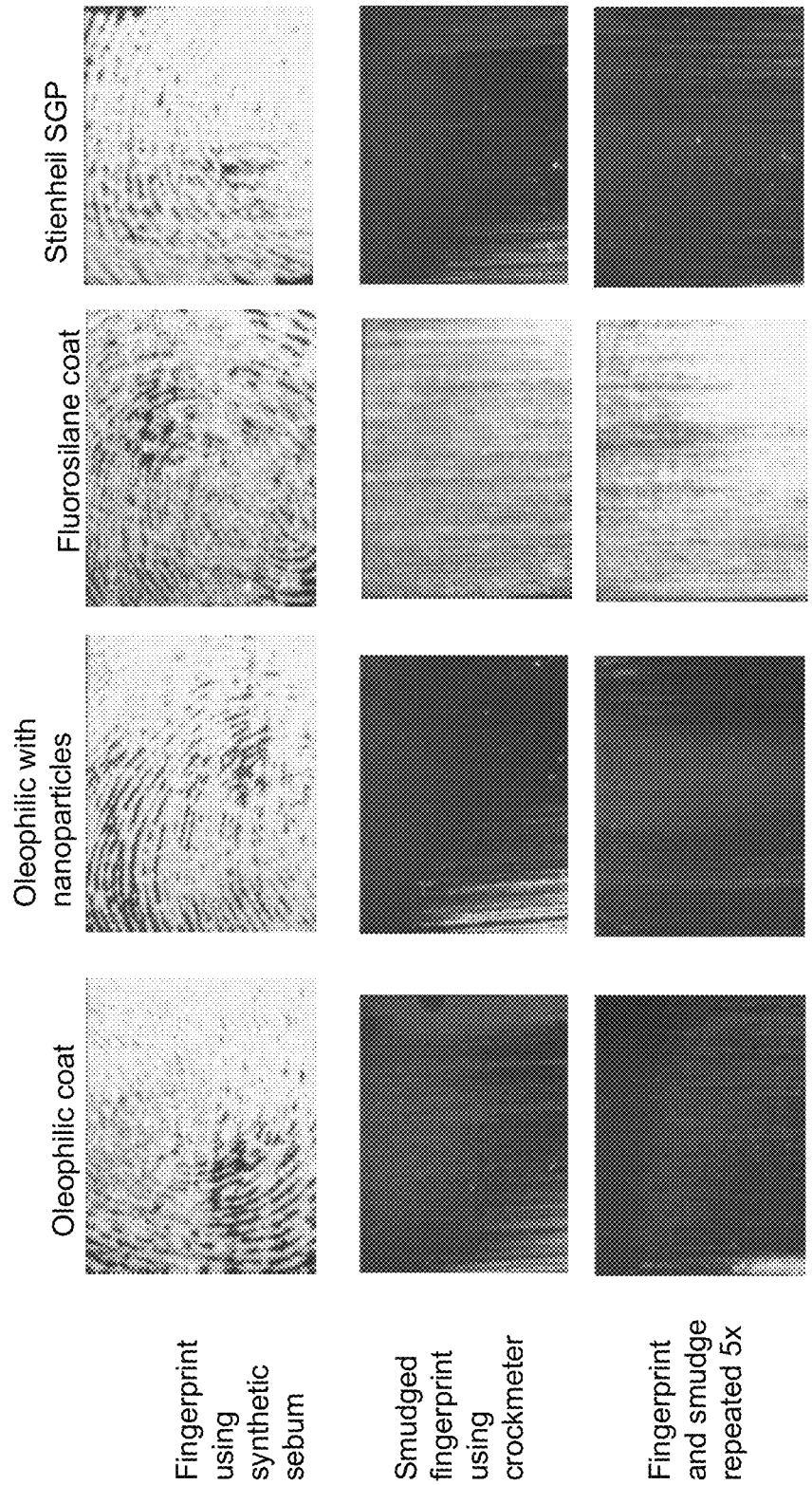
FIG. 5 illustrates the visual smudge characteristics of various coated glass articles relative to the number of touch-and-wipe cycles performed thereon as seen under standard lighting conditions in accordance with EXAMPLE 7.

Finally, a visual comparison of the smudge resistance of these samples over time was also made. This comparison was done using the touch-and-wipe procedure described hereinabove, with the exception that, rather than recording the weight of the coated articles, their visual characteristics was observed after each cycle of interest. The results of this visual comparison are shown in FIG. 5. FIG. 5 does not include the visual characteristics of the 50 nm $SiO_2$ w/25% T-111 sample. As seen in the top row of FIG. 5, a substantial amount of fingerprint residue was transferred to each sample during the first touch. As seen in the middle row of FIG. 5, significantly more fingerprint residue can be seen on the EC sample than on the other three samples after the first smudge. Similarly, after 5 touch-and-wipe cycles, significantly more fingerprint residue can be seen on the EC sample than on the other three samples.

This example illustrates the significant improvement in smudge resistance obtained from the oleophilic coatings of EXAMPLES 1 and 2 relative to the EC sample of COMPARATIVE EXAMPLE 4. In addition, this example illustrates that a slight improvement can be obtained over the SGP sample of COMPARATIVE EXAMPLE 5, but without having to apply a separate film to the substrate, which can cause delamination and bubbling issues over time.

EXAMPLE 8: Mass Transfer and Haze Characterization of Coated Glass Samples

In this example, the smudge-resistance of various coated articles that were prepared in accordance with EXAMPLES 1, 2, 4, and 5 was compared in the same fashion as described in EXAMPLE 7, with three exceptions. First, this example does not include the 50 nm $SiO_2$ w/25% T-111 sample. Second, no visual comparison is provided in this example. Finally, rather than using a Crockmeter or linear abrader to carry out the wiping step for each touch-and-wipe cycle, a human fingerprint was used. Great care was taken to ensure that substantially the same pressure was applied to each wipe.

Figure 6:
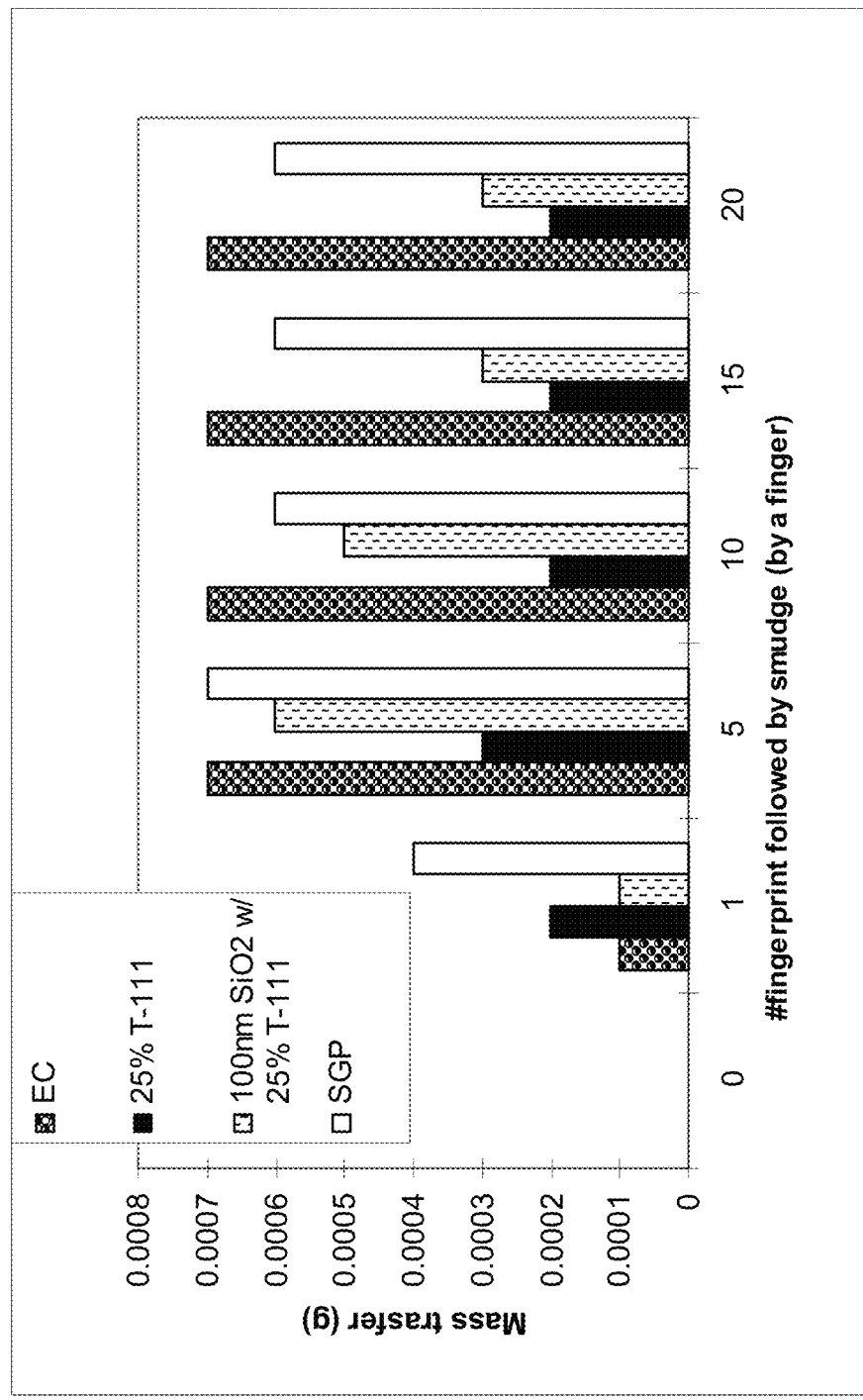
FIG. 6 is a graphical representation of the amount of synthetic fingerprint residue mass that was transferred to various coated glass articles relative to the number of touch-and-wipe cycles performed thereon in accordance with EXAMPLE 8.

The results of the fingerprint residue mass transfer analysis can be seen in FIG. 6, which plots the mass transferred to the coated articles vs. the number of touch-and-wipe cycles. As shown in the graph of FIG. 6, the EC and SGP samples retained the most fingerprint residue over time. In addition, the EC sample experienced the greatest change in fingerprint residue mass transfer after each touch-and-wipe cycle relative to the first cycle. In contrast, after 20 touch-and-wipe cycles, the change in fingerprint residue mass transfer for the 25% T-111 sample was minimal. The change in fingerprint residue mass transfer for the 100 nm $SiO_2$ w/25% T-111 and SGP samples over time was similar.

Figure 7:
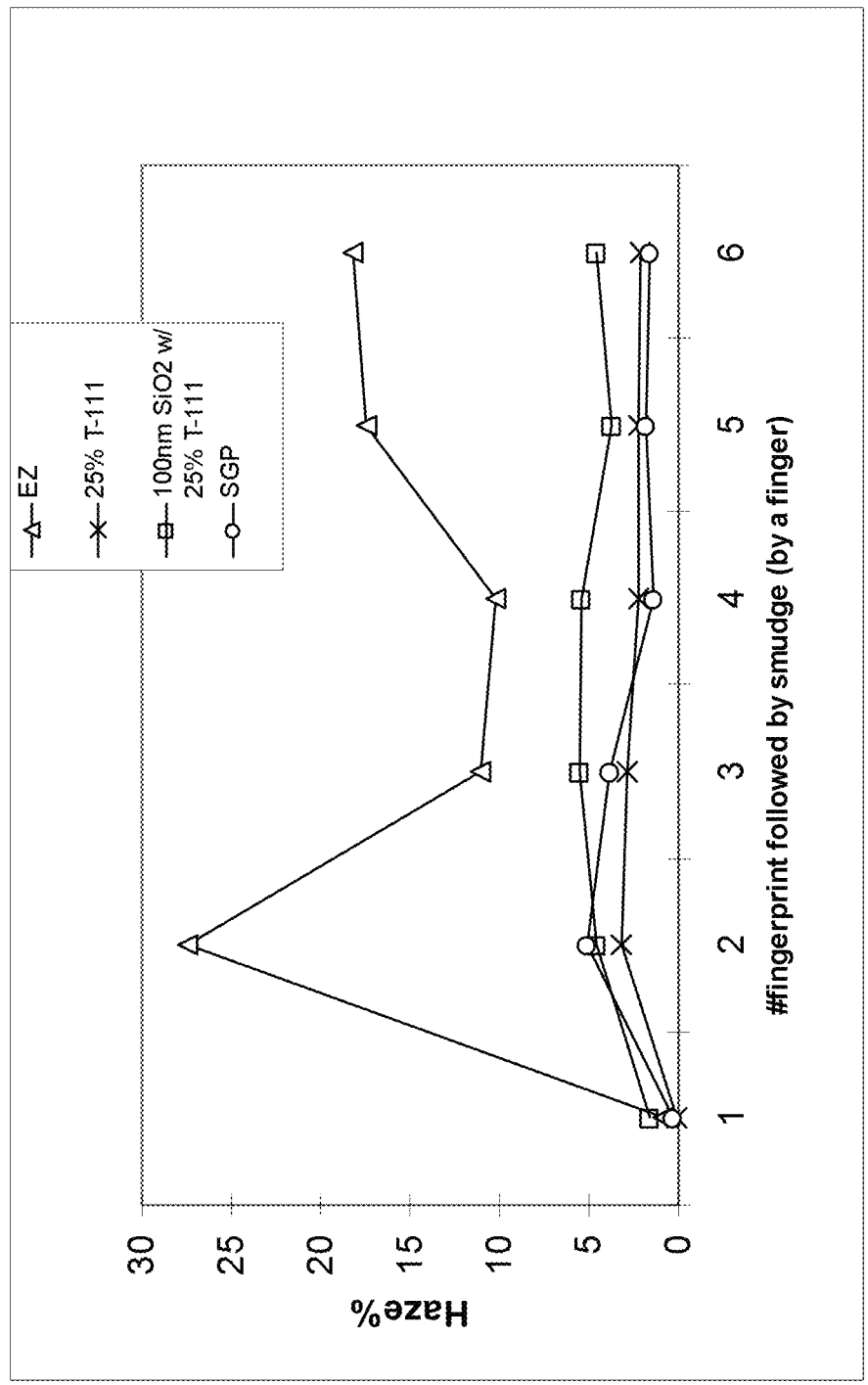
FIG. 7 is a graphical representation of the haze of various coated glass articles relative to the number of touch-and-wipe cycles performed thereon in accordance with EXAMPLE 8.

The results of the haze analysis can be seen in FIG. 7, which plots the haze of the coated articles vs. the number of touch-and-wipe cycles. As shown in the graph of FIG. 7, the EC sample exhibited the highest haze over time. In addition, this sample experienced the greatest change in haze after each touch-and-wipe cycle relative to the first cycle. In contrast, after 20 touch-and-wipe cycles, the change in haze for the SGP, 25% T-111 and 100 nm $SiO_2$ w/25% T-111 samples was minimal.

This example illustrates the significant improvement in smudge resistance obtained from the oleophilic coatings of EXAMPLES 1 and 2 relative to the EC sample of COMPARATIVE EXAMPLE 4. In addition, this example illustrates that either a slight improvement over, or similar results to, the SGP sample of COMPARATIVE EXAMPLE 5 can be obtained, but without having to apply a separate film to the substrate, which can cause delamination and bubbling issues over time.

EXAMPLE 9: Fabrication of Fully-Cured Oleophilic Coatings on Flat Glass Substrates In this example, oleophilic coatings were prepared on flat glass substrates. The substrates chosen were flat glass sheets having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$.

To form the oleophilic coating, as-received Accuglass® T 11 (111, Honeywell) was diluted in isopropanol to form various solutions ranging from about 25 weight percent (wt %) to about 50 wt % methyl siloxane. These solutions were coated onto samples of the glass sheets using the spin-coating process as provided by the manufacturer for use on silicon wafers. The spin-coated samples were cured by using the following heating cycle: from room temperature, the temperature was ramped up to about 80 degrees Celsius (° C.) at a rate of about 5 degrees Celsius per minute (° C./min), held at temperature for about 1 min, ramped at a rate of about 5° C./min to about 150° C., held at temperature for about 1 min, ramped at a rate of about 5° C./min to about 250° C., held at temperature for about 1 min, ramped at a rate of about 5° C./min to about 425° C., held at temperature for about 1 hour in nitrogen, and ramped down to room temperature at a rate of 10° C./min in air.

EXAMPLE 10: Contact Angle and Surface Energy Characterization of Coated Glass Samples In this example, the contact angles between various fluids and various coated articles produced in accordance with EXAMPLEs 1 and 9 were compared. In addition, the surface energies of such articles were compared.

Each contact angle measurement was made using a Kruss DSA100 Goniometer. The fluids used for these measurements included de-ionized water (surface tension of 72.3 milliNewtons per meter (mN m$^{-1}$)), oleic acid (32.8 mN m$^{-1}$), hexadecane (27.6 mN m$^{-1}$), and ethylene glycol (47.7 mN m$^{-1}$). A droplet of a given fluid (about 2 microliters for water, and about 4 microliters for the organic fluids) was placed on the surface of a coated article, and the contact angle was measured. This procedure was repeated five times, placing the droplets in five different locations on the surface for each sample. Three different samples were measured as such, and an average of all 15 measurements was taken as the contact angle for that type of coated article.

The total surface energy of the coated article was determined by taking the sum of the polar energy component and the dispersive energy component. The surface energy was estimated from the contact angle measurements of this example using the KRUSS Drop Shape Analysis program to run a calculation using models such as Wu, Fowkes, and Owens-Wendt. When calculating the surface energy according to each of these models, the software calculated the polar component of the surface energy, the disperse component of the surface energy, and the total surface energy according to each model using the parameters for these models established by the software program. These estimates were recorded for each sample, and an average value across 5 samples is reported.

The contact angles and surface energies were measured for a number of samples produced under different conditions in accordance with EXAMPLEs 1 and 9. TABLE 1 illustrates representative contact angles relative to the maximum temperature used to cure the oleophilic coating on the glass substrate.

TABLE 1

| Cure Conditions | Oleic Acid | Ethylene Glycol | Hexadecane | Water |
|---|---|---|---|---|
| EXAMPLE 1: 180° C. | 30.2° | 59.1° | 22.8° | 81.3° |
| EXAMPLE 1: 300° C. | 29.8° | 57.5° | 24.7° | 81.2° |
| EXAMPLE 9: 425° C. | 42.7° | 73.1° | 27.4° | 92.9° |

As can be seen from the data in TABLE 1, the fully-cured samples of EXAMPLE 9 were less oleophilic than the partially-cured samples of EXAMPLE 1, despite having a higher concentration of hydroxyl groups on the surface (which was separately verified by solid state NMR).

The surface energies of the samples shown in TABLE 1 were calculated, and are shown in TABLE 2, wherein "D" represents the disperse component of the surface energy, "P" represents the polar component of the surface energy, and "T" represents the total surface energy, and all surface energy values are shown in units of mJ/m$^2$.

TABLE 2

| | Wu Model | | | Fowkes Model | | | Owens-Wendt Model | | |
|---|---|---|---|---|---|---|---|---|---|
| Cure Conditions | D | P | T | D | P | T | D | P | T |
| EXAMPLE 1: 180° C. | 24.3 | 9.5 | 33.8 | 25 | 6 | 31 | 23.6 | 7.4 | 31 |
| EXAMPLE 1: 300° C. | 24 | 10 | 34 | 24.7 | 6.4 | 31.1 | 23.6 | 7.5 | 31.1 |
| EXAMPLE 9: 425° C. | 23.7 | 4.5 | 28.2 | 24 | 2 | 26 | 22.3 | 3.2 | 25.5 |

As can be seen from the data in TABLE 2, the variations between the sample types are found in the polar component of the surface energy. That is, the disperse component of the surface energies of each type of sample was substantially similar in each model. When the cure temperature was increased, resulting in a fully-cured methyl siloxane as the oleophilic coating, the polar component of the surface energy, and the total surface energy decreased significantly.

This example illustrates the improvement in oleophilicity and surface energy obtained from the partially-cured oleophilic coatings of EXAMPLE 1 relative to the fully-cured oleophilic coatings of EXAMPLE 9.

EXAMPLE 11-Compressive Stress and Depth of Layer Characterization of Coated Glass Samples In this example, the changes in compressive stress and depth of layer of the chemically strengthened substrates of various coated articles that were prepared in accordance with EXAMPLEs 1 and 9 were compared.

The CS of the layer under compression, and the DOL were measured using an FSM 6000/6000LE glass surface stress meter, which is an optical tool that generally uses the photoelastic constant and index of refraction of the substrate material itself, and converts the measured optical interference fringe patterns to specific CS and DOL values. To determine the amount of change in the CS and DOL values, an initial CS and DOL value was obtained for each sample prior to forming the oleophilic coating. After the curing step, a final CS and DOL value was obtained for each sample, and a comparison was made against the initial value. In each case, the absolute value of the change is provided.

TABLE 3 illustrates representative changes in CS and DOL data relative to the maximum temperature used to cure the oleophilic coating on the glass substrate for samples produced under different conditions in accordance with EXAMPLEs 1 and 9.

TABLE 3

| Cure Conditions | Change in CS | Change in DOL |
| --- | --- | --- |
| EXAMPLE 1: 200° C. | 0.2% | 0.6% |
| EXAMPLE 1: 300° C. | 2.1% | 2.5% |
| EXAMPLE 9: 425° C. | 25% | 17% |

As can be seen from the data in TABLE 3, the fully-cured samples of EXAMPLE 9 resulted in significant changes in the CS and DOL values of the layer under compression in the chemically strengthened glass substrate. In contrast, the partially-cured samples of EXAMPLE 1 exhibited substantially no change in the CS and DOL values after the curing step.

This example illustrates the improved stability of the surface properties of the chemically strengthened glass substrates from the partially-cured oleophilic coatings of EXAMPLE 1 relative to the fully-cured oleophilic coatings of EXAMPLE 9.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A coated article, comprising:
   a glass or glass-ceramic substrate; and
   an oleophilic coating having an average thickness of less than or equal to about 100 nanometers disposed on at least a portion of a surface of the glass or glass-ceramic substrate;
   wherein the coated article has a first optical transmittance and a first haze after a first touch-and-wipe cycle, wherein each touch-and-wipe cycle comprises tactilely contacting a portion of the coated article with a tactilely-transferred residue and subsequently tactilely wiping at least the portion;
   wherein the coated article has a second optical transmittance and a second haze after undergoing a number of touch-and-wipe cycles; and
   wherein the first optical transmittance and the second optical transmittance are substantially similar and/or the first haze and the second haze are substantially similar when the number of touch-and-wipe cycles is at least 20.

2. The coated article of claim 1, further comprising an intermediate layer interposed between the glass or glass-ceramic substrate and the oleophilic coating.

3. The coated article of claim 2, wherein the intermediate layer comprises a reflection-resistant coating, a glare-resistant coating, or a color-providing composition.

4. The coated article of claim 1, wherein the glass or glass-ceramic substrate comprises a silicate glass, borosilicate glass, aluminosilicate glass, or boroaluminosilicate glass, which optionally comprises an alkali or alkaline earth modifier.

5. The coated article of claim 1, wherein the glass or glass-ceramic substrate is a glass-ceramic comprising a glassy phase and a ceramic phase, wherein the ceramic phase comprises β-spodumene, β-quartz, nepheline, kalsilite, or carnegieite.

6. The coated article of claim 1, wherein the glass or glass-ceramic substrate has an average thickness of less than or equal to about 2 millimeters.

7. The coated article of claim 1, wherein the oleophilic coating is formed from an uncured or partially-cured siloxane coating precursor comprising an inorganic side chain that is reactive with the surface of the glass or glass-ceramic substrate.

8. The coated article of claim 1, wherein the oleophilic coating is formed from a partially-cured linear alkyl siloxane coating precursor.

9. The coated article of claim 8, wherein the partially-cured linear alkyl siloxane coating precursor comprises a partially-cured methyl siloxane coating precursor.

10. The coated article of claim 1, wherein a mass of tactilely-transferred residue remaining on the coated article after at least 20 touch-and-wipe cycles is substantially similar to a mass of tactilely-transferred residue remaining on the coated article after the first touch-and-wipe cycle.

11. The coated article of claim 10, wherein the mass of tactilely-transferred residue remaining on the coated article after at least 20 touch-and-wipe cycles is within 0.4 milligrams of the mass of tactilely-transferred residue remaining on the coated article after the first touch-and-wipe cycle.

12. The coated article of claim 1, wherein the second optical transmittance is within 3 percent of the first optical transmittance when the number of touch-and-wipe cycles is at least 20.

13. The coated article of claim 1, wherein the second haze is within 5 percent of the first haze when the number of touch-and-wipe cycles is at least 20.

14. The coated article of claim 1, wherein the coated article comprises a portion of a touch-sensitive display screen or cover plate for an electronic device, a non-touch-sensitive component of an electronic device, a surface of a household appliance, or a surface of a vehicle component.

15. A coated article, comprising:
   a chemically-strengthened alkali aluminosilicate glass substrate comprising a layer under compression that extends from a surface of the glass or glass-ceramic substrate inward to a selected depth; and
   a partially-cured methyl siloxane oleophilic coating having an average thickness of less than or equal to about 50 nanometers disposed directly on at least a portion of the surface of the chemically-strengthened alkali aluminosilicate glass substrate;

wherein the partially-cured methyl siloxane oleophilic coating comprises a plurality of pendant hydroxyl groups;

wherein a concentration of the pendant hydroxyl groups in the partially-cured methyl siloxane of the oleophilic coating is at least about 50 percent of a concentration of any pendant hydrogen and methyl groups in the partially-cured methyl siloxane;

wherein the coated article has a first optical transmittance and a first haze after a first touch-and-wipe cycle, wherein each touch-and-wipe cycle comprises tactilely contacting a portion of the coated article with a tactilely-transferred residue and subsequently tactilely wiping at least the portion;

wherein the coated article has a second optical transmittance and a second haze after undergoing a number of touch-and-wipe cycles;

wherein the first optical transmittance and the second optical transmittance are within 2 percent when the number of touch-and-wipe cycles is at least 20; and wherein the first haze and the second haze are within 3 percent when the number of touch-and-wipe cycles is at least 20.

16. The coated article of claim 15, wherein a mass of tactilely-transferred residue remaining on the coated article after at least 20 touch-and-wipe cycles is within 0.3 milligrams of a mass of tactilely-transferred residue remaining on the coated article after the first touch-and-wipe cycle.

17. The coated article of claim 15, wherein a contact angle between a drop of oleic acid and the oleophilic coating is about 25° to about 32°;

wherein a contact angle between a drop of ethylene glycol and the oleophilic coating is about 52° to about 60°;

wherein a contact angle between a drop of hexadecane and the oleophilic coating is about 21° to about 28°; and/or wherein a contact angle between a drop of water and the oleophilic coating is about 77° to about 82°.

18. The coated article of claim 15, wherein a compressive stress of the layer under compression is about 600 megaPascals to about 1000 megaPascals, and the depth of the layer under compression is about 40 micrometers to about 70 micrometers.

19. A method of making a coated article, the method comprising:

forming an oleophilic coating having an average thickness of less than or equal to about 100 nanometers on at least a portion of a surface of a glass or glass-ceramic substrate;

wherein the coated article has a first optical transmittance and a first haze after a first touch-and-wipe cycle, wherein each touch-and-wipe cycle comprises tactilely contacting a portion of the coated article with a tactilely-transferred residue and subsequently tactilely wiping at least the portion;

wherein the coated article has a second optical transmittance and a second haze after undergoing a number of touch-and-wipe cycles; and wherein the first optical transmittance and the second optical transmittance are substantially similar and/or the first haze and the second haze are substantially similar when the number of touch-and-wipe cycles is at least 20.

20. The method of claim 19, further comprising forming an intermediate layer on at least a portion of the surface of the glass or glass-ceramic substrate prior to forming the oleophilic coating, wherein the intermediate layer comprises a reflection-resistant coating, a glare-resistant coating, or a color-providing composition.

21. The method of claim 19, wherein a mass of tactilely-transferred residue remaining on the coated article after at least 20 touch-and-wipe cycles is substantially similar to a mass of tactilely-transferred residue remaining on the coated article after the first touch-and-wipe cycle.

22. The method of claim 19, wherein the second optical transmittance is within 3 percent of the first optical transmittance when the number of touch-and-wipe cycles is at least 20 and/or wherein the second haze is within 5 percent of the first haze when the number of touch-and-wipe cycles is at least 20.

23. The method of claim 19, wherein the forming step comprises forming a partially-cured siloxane comprising a plurality of pendant hydroxyl groups, wherein a concentration of the pendant hydroxyl groups in the partially-cured siloxane of the oleophilic coating is at least about 25 percent of a concentration of any pendant hydrogen and hydrocarbon groups in the partially-cured siloxane.

* * * * *